United States Patent Office 3,679,396
Patented July 25, 1972

3,679,396
MERCURY RECOVERY FROM SEDIMENT
Vernon A. Stenger, Midland, Mich., assignor to The Dow
Chemical Company, Midland, Mich.
No Drawing. Filed Jan. 14, 1971, Ser. No. 106,559
Int. Cl. C22b 7/00, 43/00; E02d 29/00
U.S. Cl. 75—81
6 Claims

ABSTRACT OF THE DISCLOSURE

A method is provided for recovering mercury from sediment at the bottom of a body of water by overlaying the sediment with a layer of metal containing at least one of aluminum, magnesium and zinc. Preferably, the metal is in sheet form for more efficient interception of mercury vapor rising from the sediment. After removal of the metal from the water body, the mercury, which forms an amalgam on the surface of the metal, may be recovered by distillation from the metal surface.

THE SPECIFICATION

It has been recently discovered that metallic mercury discharged to water bodies, such as rivers and lakes, is gradually transformed into soluble mercury compounds. These compounds become dispersed in the water and ultimately concentrated in marine animal life. Accordingly, there is a need for methods to recover metallic mercury from the bottom of rivers and lakes. Furthermore, there is a need to recover mercury from sludge ponds or lagoons in which industrial waste containing mercury have been impounded.

An object of the instant invention is to provide such a method. A further object is to porvide a method for achieving mercury decontamination of the sediments and ultimate recovery of the mercury as a purified reusable product.

DESCRIPTION OF THE INVENTION

In one embodiment, the instant invention comprises overlaying sediment at the bottom of a body of water containing metallic mercury with a layer of a metal containing a mercury amalgamating content of at least one of aluminum, magnesium and zinc. The metal layer overlies the sediment in the sense that it is in relatively close proximity to the sediment from which mercury recovery is desired. Most conveniently, the metal layer will rest directly upon the surface of the sedment at the bottom of the water body but it may be positioned either directly above and somewhat apart from the sediment surface, or even somewhat below the surface of the sediment. It is not essential to the invention that the sediment be of any particular analysis. Bottom sediments are known to vary widely in their consistency and composition. The instant invention is applicable to any form of sediment containing metallic mercury regardless of whether it is essentially organic or inorganic. Inorganic sediments are usually siliceous, clayey, or calcareous in their essential composition.

It is desirable that the metal layer overlay the sediment in an essentially continuous fashion for efficient recovery of the mercury. Such a layer may take the form of particular or sheet-like materials distributed substantially uniformly over the surface of the sediment. For convenience of retrieval, it is preferred that the layer of metal be in the form of sheets, which may be interlinked to provide shingle or chain-like continuous coverage.

As utilized in the practice of the invention, the amalgamating metal layer may be provided as the elemental active metal but usually it will be in the form of an alloy. Suitable metals include, for example, the interalloys of aluminum, magnesium and zinc and alloys of these active metals with conventional alloying constituents such as iron, silicon, manganese, lead, copper, nickel and titanium. The amount of an alloying constituent need not be controlled so long as the resulting alloy has a mercury amalgamating content of the active metal. Usually the active metal will be present as an external phase within the grain structure of the alloy. That is, the desired metal will not be totally in solution or occluded within an inoperative phase. Whenever the metal to be used has a substantial oxide coating, this should be removed as by washing with a dilute protonic acid, e.g., hydrochloric acid, for most effective results.

The ultimate, and only essential test of a suitable alloy, is that the metal form a surface amalgam with metallic mercury. This fact can be readily ascertained as by dipping the metal in mercury and determining whether the surface is wetted with metallic mercury on removal of the metal.

In a preferred embodiment, the active metal is employed as a cladding or galvanic coating on a substrate such as an iron based sheet metal. This provides an essentially continuous thin layer of the desired metal over a relatively more economicaly supporting substrate. Galvanized sheet metal is a particularly convenient and readily available form of a useful metal.

The length of time during which the sediment should be overlain with, or contacted, by the metal layer will vary according to the amount of mercury to be recovered and the efficiency of recovery desired. Some mercury will be recovered in a few days but more often contact periods of several months may occur before sufficient mercury recovery has been achieved to justify retriveal and, if desired, replacement of the metal layer. Although the amalgam formed on the metal surface can continue to accumulate mercury for extended periods of time, it is desirable, in order to minimize secondary diffusion and oxidation of the amalgam, periodically to remove the metal layer from the water body and strip accumulated mercury from its surface.

Stripping is conveniently accomplished by placing the retrieved mercury amalgamated aluminum, magnesium or zinc metal layer in a heated zone and recovering the vapors emitted therefrom to obtain a mercury distillate. Suitable distillation temperatures will vary depending upon the type of amalgam that has been formed. For zinc amalgams, the distillation of the mercury from the surface of the metal can be achieved at temperatures above about 100° C. at a pressure reduced to below about 0.5 mm. Hg. Somewhat higher minimum temperatures are more desirable in the instance of separation of mercury from aluminum and magnesium. In the latter instances, it is desirable to conduct the distillation in the presence of an inert atmosphere such as argon to minimize the formation of the metallic oxides or nitrides.

The following examples will further illustrate the practice of the instant invention.

EXAMPLE 1

A sludge containing about 600 parts per million by weight of mercury was obtained from the bottom of a mercury contaminated pond. Seven pellets of particulate zinc weighing about 0.8 gram each were washed with dilute hydrochloric acid (1:10), rinsed and air dried. Six of the pellets were then mixed in a flask with 10.2 grams of the sludge and about 30 milliliters of water. This quantity of sludge contained about 6100 micrograms of mercury. The flask was allowed to stand at ambient temperature for an extended period. At certain intervals, one pellet was removed from the flask, rinsed with water, and analyzed for associated mercury. The results of these tests are set forth in the following table A.

TABLE A

| Pellet No.: | Exposure, days | Mercury found, micrograms |
|---|---|---|
| 1 | [1] 0 | 0 |
| 2 | 2 | 11 |
| 3 | 7 | 39 |
| 4 | 12 | 62 |
| 5 | 20 | 73 |
| 6 | 40 | 119 |
| 7 | 165 | 520 |

[1] Blank.

From these data, it is apparent that the presence of the zinc pellets resulted in significant separation of metallic mercury from the sludge.

Recovery of the mercury from the zinc-mercury amalgam is achieved by heating the metal at reduced pressure and above about 100° C. but below that temperature at which the zinc itself begins to distill in significant amounts. Preferably such a distillation is conducted at a temperature from about 150 to 200° C. and a pressure below about 1 mm. of mercury. After recovery of the mercury by distillation, the zinc is cleaned as by washing with a dilute mineral acid and reused.

EXAMPLE 2

River mud containing a trace amount of mercury was placed in a petri dish. Four coupons of galvanized steel, 22 gauge sheet cut into 3 x 3 cm. squares, were placed on top of the mud and sufficient water was added to completely cover the mud and the metal coupons. After a certain interval of exposure, one coupon was removed and replaced with an identical coupon. The one removed was analyzed to determine the mercury absorbed on its surface.

The results of such tests on two muds containing about 25 and 131 parts per million by weight mercury, respectively, are reported in the following table B.

TABLE B

| Exposure interval (days) | Micrograms Hg per square | |
|---|---|---|
| | Mud No. 1, 25 p.p.m. Hg | Mud No. 2, 131 p.p.m. Hg |
| 0 | 0.4 | 0.4 |
| 3 | 2.2 | 1.5 |
| 6 | 1.2 | 10.7 |
| 27 | 1.1 | 42 |
| 128 | 0.8 | 73 |
| 160 | 0.9 | 125 |

The above data were obtained by dissolving the entire sample in aqua regia, making the solution to volume, and analyzing aliquots for mercury by the so-called cold atomic absorbance method. Results are significant to within approximately one microgram in the 0 to 10 microgram range. For amounts of more than 10 micrograms, the results are significant within about 10% of the reported values. Thus the data indicate that practically no mercury was recovered from the sediment containing 25 p.p.m. This sediment is thought to contain mercury in the form of oxide or sulfide rather than as metallic mercury. The sample containing 131 p.p.m. mercury appeared to be capable of releasing a significant fraction of its mercury to the galvanized iron.

What is claimed is:

1. A method for separating metallic mercury from sediment at the bottom of a water body which comprises overlaying the sediment with a layer of metal containing a mercury amalgamating content of at least one of aluminum magnesium and zinc to form a mercury amalgam, retrieving the metal layer from the water body and distilling mercury from the amalgam on its surface.

2. A method as in claim 1 wherein the layer of metal is provided in the form of chain-linked sheets.

3. A method as in claim 1 wherein the layer of metal is provided in the form of galvanised iron.

4. A method as in claim 1 wherein overlaying the sediments with the metal layer is achieved by placing a layer of metal directly onto the surface of the bottom sediment.

5. A method as in claim 1 wherein the layer of metal contains a mercury amalgamating content of zinc and distillation is accomplished by heating the metal amalgam at a temperature with the range from about 300 to 400° C.

6. A method as in claim 5 wherein the layer of metal containing a mercury amalgamating content of zinc is in the form of sheets which are substantially uniformly and continuously distributed over the sediment at the bottom of the water body.

References Cited

UNITED STATES PATENTS

| 802,183 | 10/1905 | Durbrow | 210—170 |
| 1,060,870 | 5/1913 | Wiley | 210—170 |
| 1,119,377 | 12/1914 | Thornhill | 75—109 X |
| 2,266,475 | 12/1941 | Ramsay | 75—81 |
| 3,039,865 | 6/1962 | Gilbert et al. | 75—109 X |
| 3,572,506 | 3/1971 | Bandy et al. | 210—170 X |
| 3,600,156 | 8/1971 | Clapton et al. | 75—109 X |

HENRY W. TARRING II, Primary Examiner

U.S. Cl. X.R.

75—109, 121; 210—65, 170